Nov. 11, 1952     P. A. GIGUERE     2,617,940
ULTRAVIOLET PHOTOMETRIC METHOD AND APPARATUS
Filed Nov. 12, 1948
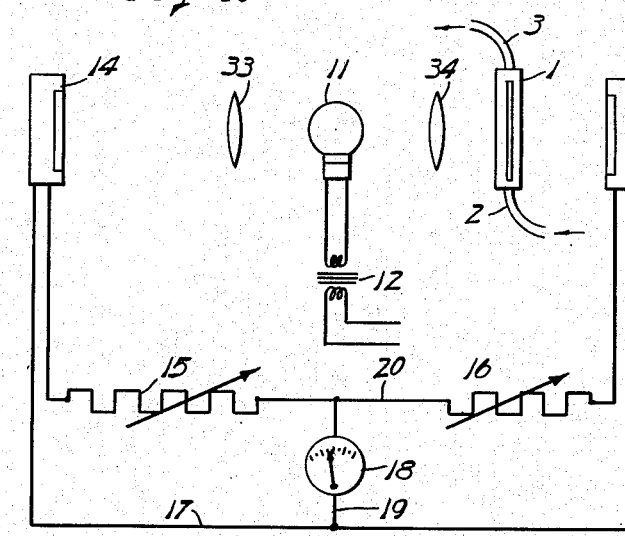
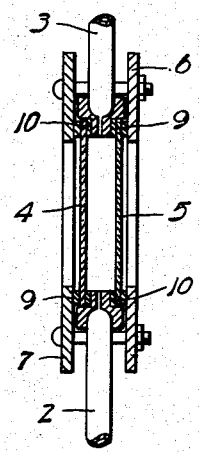
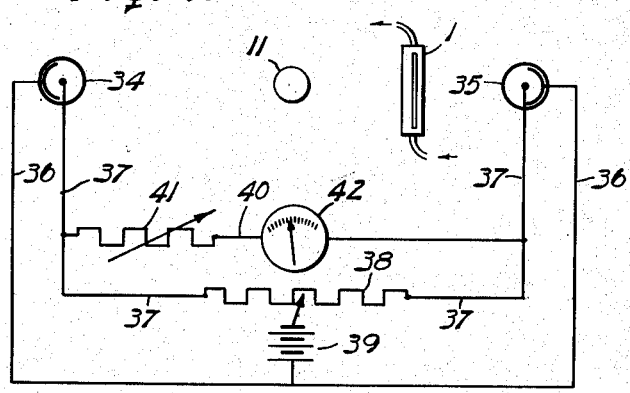
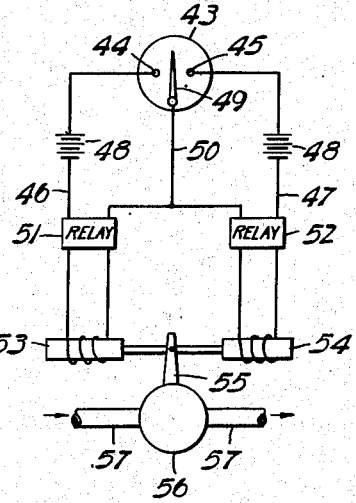
INVENTOR
Paul A. Giguère
BY
Bean, Brooks, Buckley & Bean
ATTORNEYS Patented Nov. 11, 1952

2,617,940

UNITED STATES PATENT OFFICE 2,617,940

ULTRAVIOLET PHOTOMETRIC METHOD AND APPARATUS

Paul A. Giguère, Quebec, Quebec, Canada

Application November 12, 1948, Serial No. 59,498

5 Claims. (Cl. 250—43.5)

The present invention comprises a photoelectric apparatus whereby a desired measure or control may be exercised on a stream of a liquid material which possesses a condition or property influencing ultraviolet radiation (e. g. absorbing ultraviolet) and also comprises a process of measuring, regulating or determining the concentration of hydrogen peroxide solutions and others which absorb ultraviolet.

In the accompanying drawing, Fig. 1 illustrates conventionally an apparatus embodying my invention; Fig. 2 is a longitudinal section of a cell for the circulation of a liquid to be subjected to ultraviolet radiation; Fig. 3 illustrates an apparatus in which electric devices responsive to ultraviolet carry out regulatory operations; and Fig. 4 illustrates a modification containing photoelectric cells.

Although not limited in its application or usefulness to any specific operation, or for a specific liquid composition, ultraviolet-responsive apparatus embodying my invention will be described and illustrated in its operation for the indication, measure or control of the concentration of aqueous solutions of hydrogen peroxide. Such operation is based mainly on the absorptiveness or opacity for ultraviolet of liquid media to be measured or controlled. Absorption of ultraviolet varies in accordance with the concentration of such liquid media over a working range in accordance with a physical law. Heretofore no utilization has been made of this relationship for the measure or regulation of hydrogen peroxide concentration.

In the manufacture of hydrogen peroxide, dilute aqueous solutions of peroxide may be concentrated by distillation under reduced pressure. Frequent checks on the operation of the still are desirable for efficient operation. Heretofore, only discontinuous and insufficient checks have been possible. The determination of concentration of aqueous hydrogen peroxide solutions commonly has been carried out by chemical analysis which not only is time-consuming but, moreover, is unsuited for the continuous determination, control or regulation of flowing streams of hydrogen peroxide solutions.

By the present invention, a method of control and analysis is provided which is capable of indicating without the necessity of chemical analysis, either continuously or intermittently, as desired, the composition of solutions of hydrogen peroxide and other liquid materials and controlling distillation operations of hydrogen peroxide. Various other liquids may be similarly analyzed and controlled.

The absorption for ultraviolet of a concentrated aqueous solution of $H_2O_2$ begins to be appreciable at ultraviolet wave length of about 3500 Angstrom (Å) and increases rapidly at shorter wave lengths, being marked at a wave length of 2537 Å.

It has been determined that an aqueous solution of 3.1% of concentration of $H_2O_2$ transmits only about 0.2% of a beam of ultraviolet of 2537 Å wave length. A more dilute solution containing 0.1% of $H_2O_2$ transmits 86.1% of an 2537 Å ultraviolet beam. Pure water is entirely transparent to ultraviolet at 2537 Å.

Some difficulty or limitation might be expected by reason of the spontaneous decomposition of $H_2O_2$ under the influence of ultraviolet on the surface of the absorption cell. However, experience has shown that when operating with dilute, flowing solutions and low radiation level, no difficulty due to decomposition is encountered.

Liquids other than hydrogen peroxide solutions may be measured or controlled in accordance with my invention as, for example, aqueous solutions of hydrochloric acid, alkali chlorides, chlorine, ammonia and ethyl alcohol. Solutions of various compounds having the O—O bond characteristic of hydrogen peroxide may be measured or controlled similarly, for example, per-salts and per-acids, alkyl and acyl peroxides and the like.

The apparatus shown in Fig. 1 of the drawing includes an absorption cell 1 for the circulation of $H_2O_2$ solution, or other liquid medium under consideration. It is provided with an inlet duct 2 and an outlet duct 3. A suitable construction of the cell 1 is shown in Fig. 2. The absorption cell is provided with ultraviolet transmitting windows 4, 5 (Fig. 2) which have such dimension as to extend substantially over the entire radiation transmitting surface of the cell. As shown in Fig. 2, the windows 4, 5 are held by metal brackets 6, 7, suitable gaskets being provided as indicated at 9, 10. The dimensions of the cell are so chosen that the thickness of the liquid layer is of the order of one to a few millimeters, the specific dimensions depending on the range of concentration of the solutions to be analyzed, and specific characteristics of the apparatus. The rate of flow preferably should be sufficiently rapid to carry away any minute bubbles of oxygen which may result from incipient decomposition of hydrogen peroxide. Adherence of bubbles of oxygen to the windows would variably affect the radiation transmission. The windows 4, 5 may consist of thin plates of vitreous quartz or of a suitable ultraviolet transmitting glass. Adjacent the cell 1 is a generator of ultraviolet radiation 11, preferably a low pressure, mercury vapor lamp which radiates ultraviolet largely at the 2537 Å wave length of the spectrum. A suitable ultraviolet source is manufactured by the Westinghouse Lamp Division of Bloomfield, N. J. and is identified as Sterilamp WL-794. As well known, lamps of this type contain argon at a pressure of a few millimeters of mercury and some mercury vapor, which at the operating temperature of the lamp has a pressure in the range of about 1 to 10 microns of mercury. The filamentary cathode of the lamp (not shown) is heated initially by current from a separate source 12, here represented as a transformer. When the vapor pressure of mercury is sufficiently high the arc strikes, short-circuiting the filament.

The apparatus and electric connection shown in Fig. 1 are illustrative of one means for carrying out my invention which, however, is not to be understood as being restricted to the particular apparatus here shown. A beam of ultraviolet transmitted by the solution in the cell 1 impinges on a receiver 13 which may, for example, consist of a barrier layer cell containing a film of selenium or other ultraviolet-sensitive material. The glass windows of such current-generating photocells should consist of an ultraviolet-transmitting medium, for example, Corning Red Purple Corex filters No. 9863, which absorb most of the visible light. The selenium type of receiver generates electric current when illuminated, the intensity of current varying with the illumination. A second receiver 14 is connected in opposition the receiver 13 through regulable resistors 15, 16, the circuit being completed by a conductor 17. An indicating instrument 18, for example, a galvanometer, is connected in a circuit 19 uniting the conductor 17 and a connection 20 between the resistors 15, 16.

Fig. 1 also shows convex lenses 33, 34 for collimating radiation which emanates from the source 11. Although shown as desirable, they may be omitted.

When the apparatus is started, the absorption cell 1 being filled with a distilled water, and the receivers 13 and 14 being located at equal distances from the source 11, the resistor 16 is set at its low value. The resistance 15 then is varied until the instrument 18 reads zero. Thereupon the absorption cell may be filled with a solution of maximum concentration to be measured or controlled. The rheostat 16 then is varied until the instrument shows full-scale deflection. Thus adjusted, the instrument 18 will indicate directly concentration of the solution on an appropriate scale.

If desired, the galvanometer or other electro-responsive instrument 18 may be provided with electric contacts and suitable amplifying circuits for carrying out desired operations or indications with currents on a magnified scale.

Fig. 3 is a diagram of a regulatory apparatus embodying my invention. As here shown, a branch line or sample of the solution to be controlled flows through the absorption cell 25 (corresponding to cell 1, Fig. 1), ultraviolet from the generator 26 passing through the flowing liquid into a receiver 27. The output circuit 28 of the receiver 27 is connected to an apparatus 29 whereby an amplified corresponding electric current or impulse is impressed upon a controller apparatus 30. The output circuit 31 of this controller initiates appropriate control operations for example, to cause a regulator 32 to increase or decrease the concentration of the solution or otherwise to vary the operation.

Fig. 4 illustrates an apparatus in which alkali cathode photo-electric cells 34, 35 of the "blue-sensitive" type, (such as RCA-935 cells) replace the barrier-layer cells 13 and 14 of Fig. 1. The output circuits 36, 37 of these cells are connected in opposition through a potentiometer 38. Across the circuits 36, 37 and to the potentiometer 38, is connected a stable power source 39 having a voltage in the range of 90 to 150 volts. In shunt with the potentiometer 38 is connected a circuit 40 containing an adjustable resistor 41 and an indicating instrument 42. The potentiometer 38 may have a resistance of about 10,000 ohms. Assuming the absorption cell 1 to contain distilled water and the adjustable resistor 41 set at zero, the potentiometer 38 is regulated until the instrument 42 reads zero. When the distilled water is replaced by the most concentrated solution to be measured, the effective value of the resistance 41 is varied until the instrument 42 shows full scale deflection. To eliminate the effect of visible light and stray radiation appropriate filters (such as Corex Red Purple No. 9863) should be placed before the photocells.

Fig. 5 diagrammatically shows a system whereby the movable contact-making element 49 of a contact-making instrument 43 (corresponding to the instrument 18, Fig. 1) makes contact with one or the other of fixed terminals 44, 45 depending on the condition of the liquid in the absorption cell. These contacts close corresponding conductors 46, 47 containing electric sources 48, here represented by batteries. The conductors 46, 47 and the common return circuit 50 through the relays 51, 52 energize respectively electromagnetic devices 53, 54, causing movement to the left or right of a lever 55 for regulating a valve 56 in the main circulatory conduit 57 and thereby initiating a desired manufacturing control.

What is claimed is:

1. The method of determining the hydrogen peroxide content in an aqueous solution thereof which consists in conducting a thin stream of such solution through the path of a low intensity substantially monochromatic beam of ultraviolet radiation to which said solution is opaque to a substantial extent, maintaining the flow of said stream at a rate at which decomposition of hydrogen peroxide by said radiation is inappreciable and photoelectrically determining the percentage of extinction of ultraviolet radiation by said stream by comparing the amount of ultraviolet in said beam impinging upon a receiver with the amount impinging upon another receiver intercepting the beam passed through the solution.

2. The method of regulating the concentration of dilute aqueous solutions of hydrogen peroxide which consists in radiating two separate beams of ultraviolet of 2537 Å wave length from a single source, passing one only of said beams through a stream of said solution, conducting said ultraviolet beams into contact with separate photosensitive surfaces and utilizing the resulting difference in electric current thereof, which is variable with variations of opacity to ultraviolet of said solution, for carrying out desired mechanical operations.

3. A photoelectric apparatus which is responsive to a condition of a liquid comprising the combination of an absorption cell having transmissibility for a selected wave length of ultraviolet, conduits for circulating a liquid through said cell, a source of substantially monochromatic ultraviolet radiation of selected wave length, a pair of photoelectric receivers which are responsive to impinging ultraviolet radiation and delivering corresponding variable electric currents, said elements being operatively arranged to provide two separate light paths emanating from said source, each said path impinging on a corresponding one of said receivers while only one of said paths traverses said cell so as to cause radiation from said source to traverse a portion of a liquid traversing said cell and impinge upon one only of said receivers and a translating device connected to receive varying currents delivered by said receivers.

4. A photoelectric apparatus which is responsive to the ultraviolet absorptiveness of a current of liquid comprising the combination of an absorption cell providing a space for a liquid stream having a thickness in the neighborhood of a few millimeters and having an operative transmissibility for ultraviolet radiation of 2537 Å wave length, conduits for circulating a liquid through said cell, a source of ultraviolet which is substantially restricted to 2537 Å wave length, a pair of photoelectric receivers which are responsive to variable ultraviolet radiation of 2537 Å wave length, and deliver corresponding variable electric currents, said receivers each being fitted with filters to substantially exclude visible light therefrom, said elements being arranged in two optical lines, one of which comprises said source and said cell and one of said receivers and the other of which comprises said source and the other of said receivers, so as to cause radiations from said source to traverse liquid in said cell and impinge upon one only of said receivers and electromagnetic means connected in an electrical bridge circuit including said receivers for operation in accord with the difference between the currents delivered by said receivers.

5. A control apparatus for metering the hydrogen peroxide content of aqueous solutions thereof, comprising the combination of an absorption cell containing a duct having windows transparent to ultraviolet radiation, inlet and outlet conduits for said duct, a source of 2537 Å ultraviolet radiation, a pair of receivers for said radiation which are capable of translating said radiation into electric currents having variations corresponding to variations of ultraviolet impinging thereon, said elements being arranged in two optical lines, one of which comprises said source and said cell and one of said receivers and the other of which comprises said source and the other of said receivers, so as to cause radiations from said source to traverse liquid in said cell and impinge upon one only of said receivers and an electro-responsive device connected in an electrical bridge circuit including said receivers.

PAUL A. GIGUÈRE.

REFERENCES CITED

The following references are of record in the file of this patent:

UNITED STATES PATENTS

| Number | Name | Date |
| --- | --- | --- |
| 2,395,489 | Major et al. | Feb. 26, 1946 |
| 2,411,672 | Van Der Akker | Nov. 26, 1946 |
| 2,421,382 | Levinson et al. | June 2, 1947 |
| 2,452,122 | Gumaer | Oct. 26, 1948 |

OTHER REFERENCES

Film Characteristics, by H. H. Beck, Industrial and Engineering Chemistry, Nov. 1936, pgs. 1251–1254.